United States Patent

[11] 3,584,727

| [72] | Inventor | Adolf Froehlking<br>Willingboro, N.J. |
|---|---|---|
| [21] | Appl. No. | 729,677 |
| [22] | Filed | May 16, 1968 |
| [45] | Patented | June 15, 1971 |
| [73] | Assignee | Omark Industries, Incorporated<br>Portland, Oreg. |

[54] STUD ORIENTATION AND FEEDING MECHANISM
6 Claims, 6 Drawing Figs.

| [52] | U.S. Cl. | 198/33 |
|---|---|---|
| [51] | Int. Cl. | B65g 47/24 |
| [50] | Field of Search | 198/33 R1, 33 R4 |

[56] References Cited
UNITED STATES PATENTS

| 3,295,661 | 1/1967 | Mitchell, Jr. et al. | 198/33 (R1) |
| 2,915,165 | 12/1959 | Bell | 198/33.1 |
| 2,662,626 | 12/1953 | Graham et al. | 198/43 |
| 3,266,613 | 8/1966 | Grafius | 198/33 (R1) |

*Primary Examiner*—Evon C. Blunk
*Assistant Examiner*—Alfred N. Goodman
*Attorney*—Charles F. Duffield ABSTRACT: Apparatus for orienting studs in a stud feeding mechanism including a transfer passage having a relieved portion complimentary to one end of the stud to permit the stud to rotate and fall by gravity into a loading tube upon the stud being transferred by a first end through the passageway and means for oppositely inclining the stud for passage by gravity to the loading tube upon the stud passing through the passageway in opposite end orientation. A stud storage and delivery tube cut on an angle to the longitudinal axis thereof to permit lateral dissembly of the tube when filled with studs. Escapement mechanism for receiving studs by gravity including a camming surface to prevent the next adjacent stud from jamming the mechanism on transfer of the stud to the feed port and wherein the transfer mechanism, when in the loading position, leaves the feed port unobstructed for the return and discharge in the reverse direction of any stud not properly dispatched.

INVENTOR.
Adolf Froehlking

INVENTOR.
Adolf Froehlking

BY Charles F. Duffell

ATTORNEY.

STUD ORIENTATION AND FEEDING MECHANISM

SUMMARY OF INVENTION

This invention relates to stud welding apparatus and more particularly to feeding and orientating mechanisms for properly orientating studs and to the mechanism for dispatching the studs to a welding gun for automatic feed and welding thereof.

In many stud welding applications, the speed with which the studs can be loaded in gun and welded in place is of extreme importance. Studs, as a general rule, have one end which is especially designed to be welded to the workpiece. Accordingly, in any stud feeding mechanism, it is absolutely necessary that the studs be properly orientated before they are fed to the welding gun. In a like manner, if the studs are not properly orientated, they will often jam the escape mechanism used to dispatch the studs to the welding gun.

In the event there is a jam in the escapement mechanism, it is equally important that the mechanism can be readily dissembled to remove the obstruction and readily reassembled. In a like manner, if the stud is only partially dispatched through the supply tube leading to the welding gun, it is important that the stud not jam the mechanism in the event that it returns in a reverse direction to the mechanism.

The present invention is, in part, directed to a simple but effective mechanism for orientation of the studs. This mechanism includes a tunnel or passageway through which the studs are mechanically moved along their longitudinal axis without respect to their end orientation. The passageway includes an aperture in line with the direction of travel of the studs. This aperture is of diameter less than the length of the stud but of sufficient diameter to permit the stud, when turned substantially on end, to pass downwardly through the aperture into an escapement mechanism. The upper wall of the passageway at the leading edge of the aperture, is contoured with a configuration complimentary to a given one of the ends of the stud being orientated. This complimentary configuration is so designed, in respect to the overall stud length, that when the stud has passed beyond its center of gravity over the aperture, the contoured section will permit the selected one end of the stud to swing upwardly and thus let the stud drop, by its opposite end, into the receiving tube for the escapement mechanism.

If the stud is in opposite end alignment in its travel through the passageway, the complimentary configuration will not permit the noncomplying end to swing upwardly but, instead, the stud will pass across the aperture. An incline ramp on the opposite side of the aperture will cam the selected end of the stud upwardly and, again, the same end of the stud falls first into the discharge tube.

The present invention is also specifically concerned with a storage and loading tube which is disposed between the orientation mechanism and the escapement mechanism. This loading tube permits ready removal of the upper portion of the escapement mechanism even when the loading tube is filled with studs. This is accomplished, in the present invention, by means of an angular cut or joint in the tube which is of sufficient angle such that its projection along the longitudinal axis of the tube is in excess of the stud length. The supply and loading tube may be laterally separated at the joint and thus permit the ready dissembly of the escapement mechanism.

Further, the present invention is specifically concerned with an escapement mechanism which employs a transfer block for receiving a stud by gravity from the supply and loading tube. The transfer block includes a stud receptacle therein into which the stud falls by gravity and, the stud receptacle includes a camming surface on the upper end and on one side of the receptacle which acts to cam the next adjacent stud upwardly out of interfering engagement with the transfer block as the transfer block is moved into the stud discharge position. This escapement mechanism further is designed so that the feed port through which the stud is discharged will be completely unobstructed whenever the transfer block is in the loading position. This permits any stud which has been partially discharged through the feed port to return in the reverse direction through the feed line and feed port and out of the escapement mechanism so as not to interfere or jam the transfer of the next stud.

Other objects and advantages of the present invention will be apparent from the following description of the drawings and the detailed description of the invention which follows.

DESCRIPTION OF INVENTION

Figure 1:
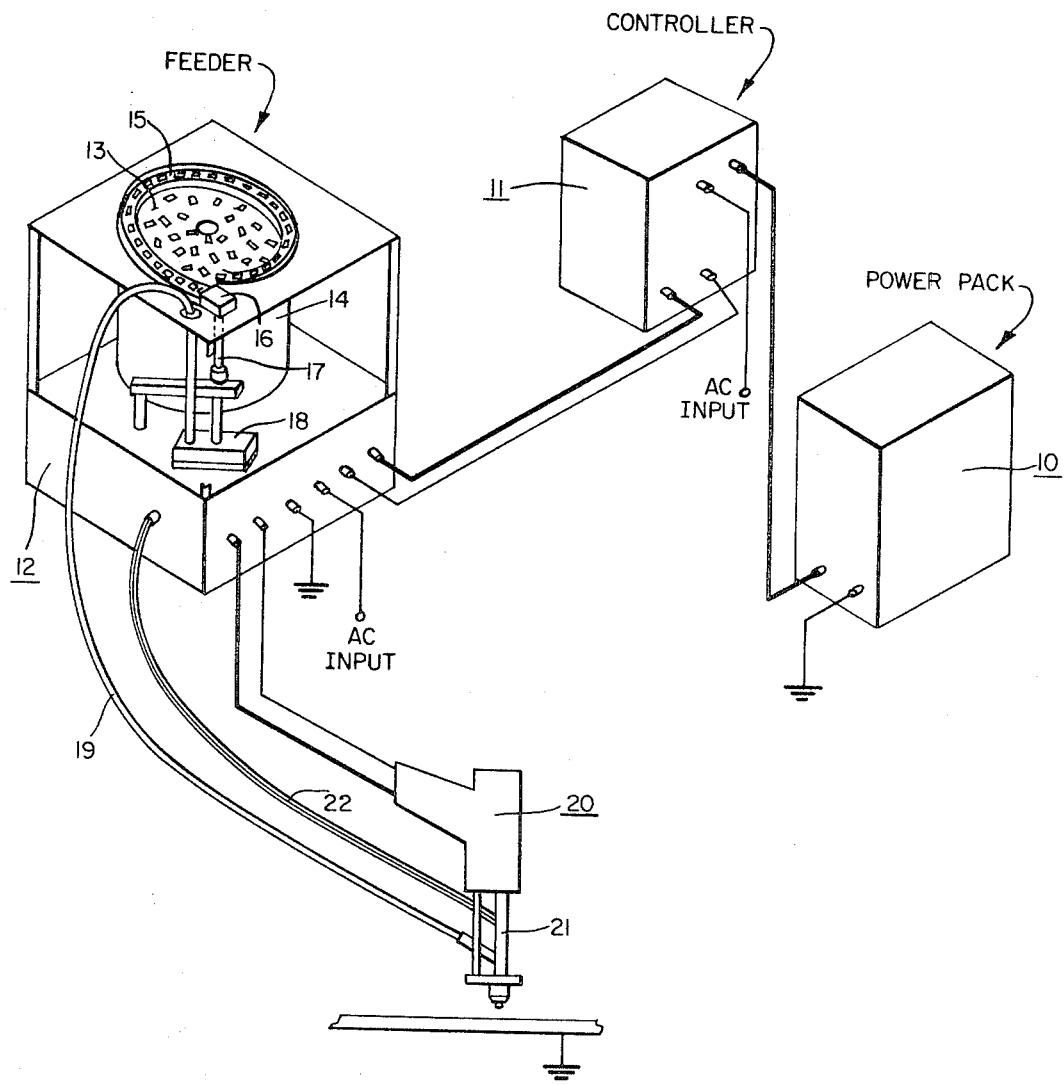
FIG. 1 is a schematic view, partly in perspective and partly in elevation of a complete welding system in which the present invention is employed.

Referring to the drawings and particularly FIG. 1, there is shown the overall apparatus or system in which the present invention is used. In the overall system contemplated, a power supply 10 is provided which in turn provides the welding energy for the welding process. This power supply may be one of many kinds, i.e., stored energy, rectified AC power input, or battery powered.

The welding power from the power pack 10 is passed into a controller 11. The controller 11, through the feeder apparatus 12, serves to control the energy from the power pack 10 by selectively turning on and off the welding current as required.

The feeder mechanism 12, in which the present invention is embodied, is here shown as one of the vibratory type. In a feeder of this type, a plurality of studs are deposited in a general depository or bowl 13. By means of a rotating or oscillating magnetic field generated in a lower housing 14 of the feeder, moving mechanical waves are established in a rotating direction in the bowl 13. These mechanical waves operate to physically move the studs from the center of the bowl outwardly toward the circumference thereof and up an inclined ramp 15 on the outer circumference of the bowl.

As the studs are moved up the ramp, they are generally aligned in an end to end configuration. However, their end to end alignment is not in respect to any particular end of the stud.

The studs, upon passing up the inclined ramp, are delivered to an orientation mechanism 16, from which they pass downwardly through a supply and loading tube 17 to an escapement mechanism 18.

Upon the studs reaching the escapement mechanism 18, they are pneumatically delivered through a feed line 19 to the welding gun 20 where they are appropriately inserted into the chuck of the gun by means of an air cylinder 21 which is pneumatically operated by an air supply line 22.

Figure 2:
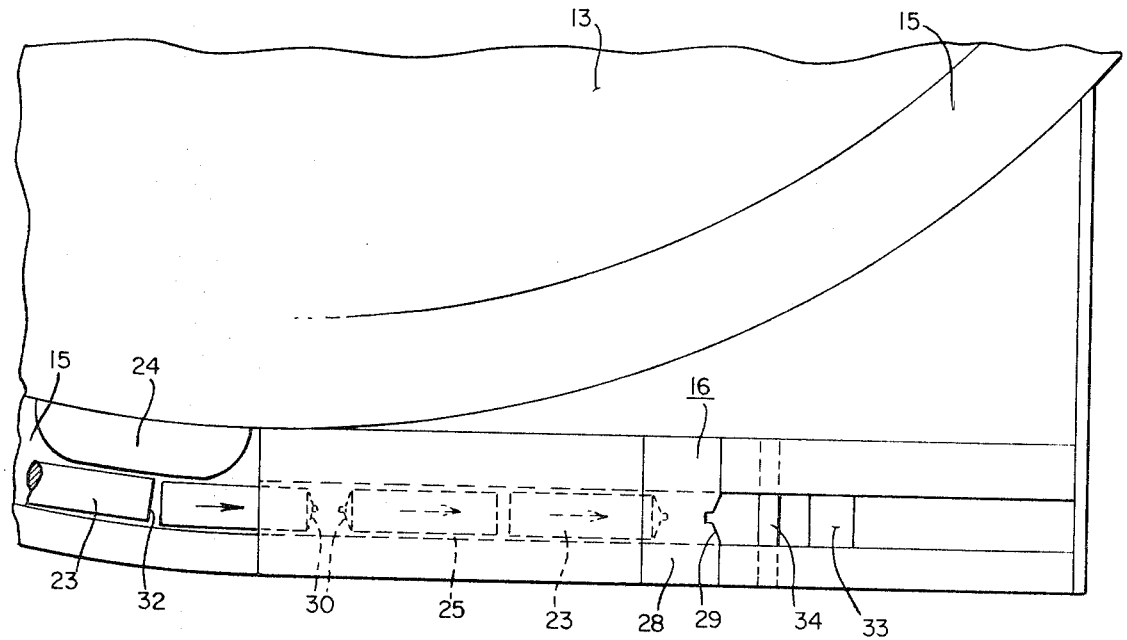
FIG. 2 is an enlarged plan view of the orientation mechanism of the present invention.

In FIG. 2, there is shown in enlarged scale, the particular portion of the stud orientation mechanism to which the present invention applies. The studs 23 may be seen in their end to end alignment as they are moving up the ramp 15. A final guide 24 insures end to end alignment of the studs as they progress into a passageway 25.

Figure 3:
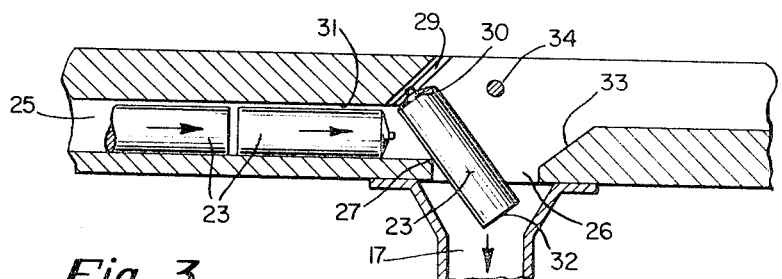
FIGS. 3 and 4 are sectional views illustrating the orientation principle of the mechanism of FIG. 2.
Figure 4:
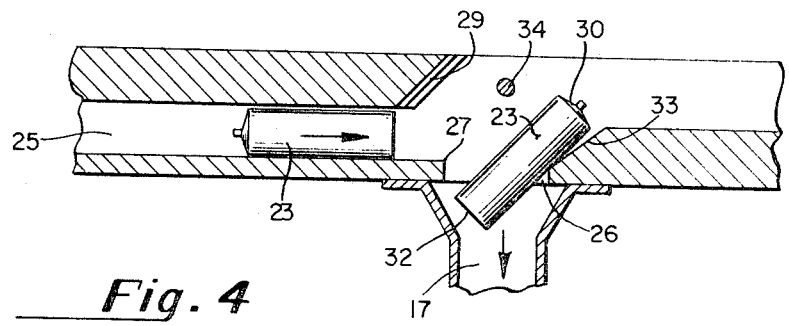

At the end of the passageway 25 is an aperture 26, shown in FIGS. 3 and 4. As the stud advances toward the aperture, its center of gravity will reach the leading edge 27 of the aperture.

Above the leading edge of the aperture, an orientation plate 28 is disposed which includes a configuration 29 therein which is complimentary to one of the end configurations 30 of the studs being orientated.

If the stud is moving through the passage 25 in the direction of the arrow with its welding end 30 thereof trailing in the passageway as shown in FIG. 3, the stud will, upon its center of gravity reaching the leading edge 27, incline or tilt upwardly into contact with the upper wall 31 of the passageway. However, since the end 30 of the stud is of complimentary configuration with the passageway at this point, the end 30 of the stud is free to swing upwardly beyond the lower surface of the wall 31. The result is that the stud will fall into the aperture 26, and loading tube 17 with its base end 32 leading. However, if the stud enters the passageway 25 with its welding end 30 thereof leading, as shown in FIG. 4, the complimentary portion 29 of the upper wall 31 of the passageway 25 will not permit the base portion 32 of the stud to pass upwardly beyond the inner surface of the wall and, consequently, the stud cannot tip as shown in FIG. 3. Instead, the stud will pass across the aperture 17, as shown in FIG. 4, and the welding base 30 thereof will come in contact with a cam surface 33. Continued travel of the stud, in the direction of the arrow, will cause the end 30 of the stud to be inclined upwardly and the stud will be tipped so as to fall into the discharge tube 17 again with its base 32 leading.

A guide pin 34 shown in FIGS. 2—4 insures that the stud, once in the loading tube, cannot be forced upwardly out of the tube.

Figure 5:
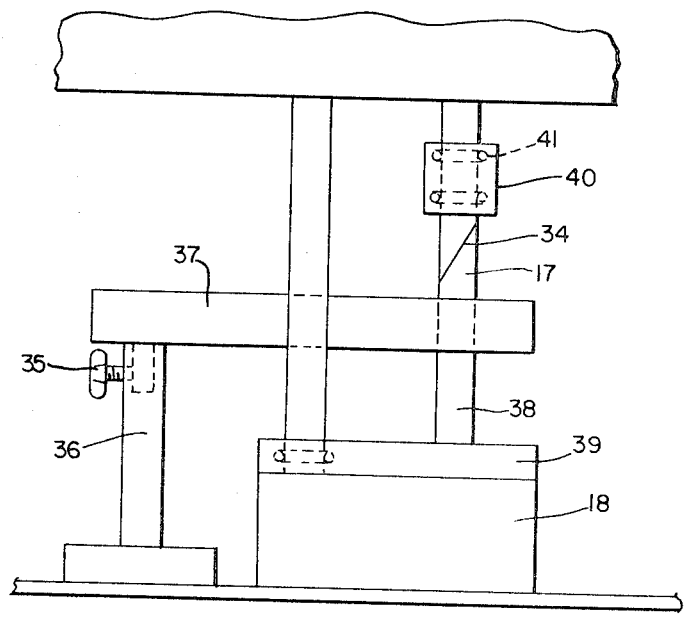
FIG. 5 is a side elevation view of the storage and loading tube of the present invention and, FIG. 6 is a sectional view of the escapement mechanism of the present invention.

As shown in FIGS. 1 and 5, the stud supply and loading tube 17 is of substantial length and extends between the stud orientating mechanism 16 and the escapement mechanism 18. The length of the supply tube 17 is critical and must be so established in respect to the combined lengths of the studs stored therein so that, when the column or tube 17 is full, the last stud to pass into the tube will still project upwardly through the aperture in the orientation mechanism a sufficient length to block the next stud passing toward the aperture from crossing over the aperture and thus falling into misorientation.

As further shown in FIG. 5, the stud supply and loading tube 17 includes a joint 34 therein which is cut at a substantial angle with respect to the longitudinal axis of the tube. This angle must be such that the projected longitudinal length of the cut is greater than that of a stud which is in the tube. When this condition exists, the supply tube 17 may be laterally separated at the joint 34 even though the tube is filled with studs. This separation is accomplished by means of loosening a thumb screw 35 from a support column 36 and moving upwardly a supporting bracket 37 which serves to further secure the lower portion 38 of the supply tube. Once the support bracket 37 is swung out of the way, the upper portion 39 of the escapement mechanism may be moved to one side and the escapement mechanism made readily available.

A collar 40 of inside configuration complimentary and in close fitting engagement with the outside configuration of the supply tube 17, serves to secure the joint 34 in place. This collar 40 is slidable longitudinally along the column 17, and, as shown in FIG. 5, when slipped upwardly over the joint, permits the joint to be laterally separated.

Two rubber O-rings 41 on the inside circumference of the collar 40 provide the required frictional engagement between the collar 40 and the tube 17 to hold the collar in place.

Figure 6:
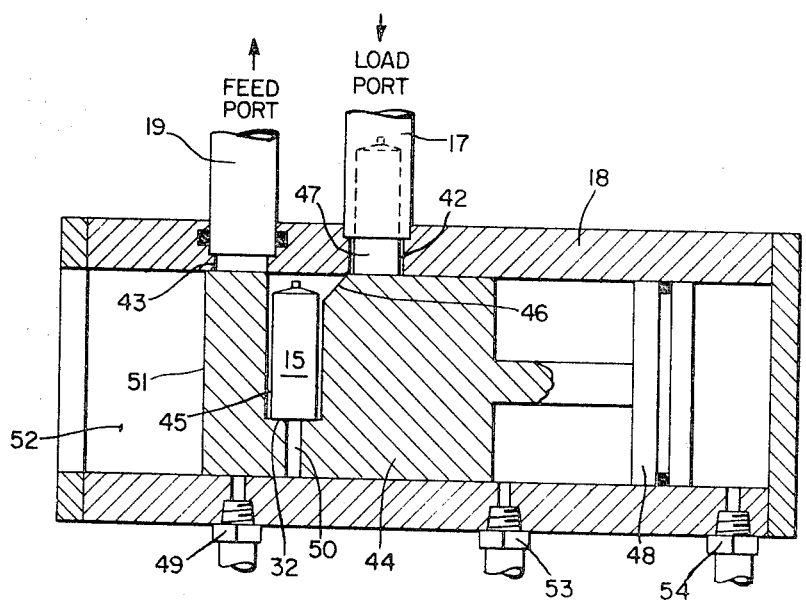

The escapement mechanism 18 of the present invention, as shown in FIG. 6, includes a loading port 42 into which the feed and loading tube 17 extends. Likewise, adjacent to the loading port there is disposed a feed port 43 into which the feed line 19 extends.

A transfer block 44 is disposed beneath the loading port 42 and feed port 43 and is adapted for reciprocal movement between the two ports. The transfer block 44 further includes a stud receptacle 45 therein into which a stud 15 may fall by gravity whenever the transfer block 44 and its included stud receptacle 45 are in registry with the loading port 42.

In stud manufacturing, it is not practical to machine the studs to such close tolerance that there is but minor variation in their length. The ordinary variation in the length of the studs will cause a problem in escapement mechanisms in that, once the stud in in place, the next to be loaded stud may extend into the loading chamber some small distance sufficient to jam the mechanism during its transfer function. In the present invention, this problem is alleviated by the inclusion of a camming surface 46 in the upper end of the stud receptacle 45 and on the side thereof adjacent to the loading port 42. This camming surface 46 serves to cam the next to be loaded stud 47 upwardly and out of interfering engagement with the transfer block 44 during the transfer of the stud 15 to the feeding port 43. In this way, acceptable tolerances may be had in the studs without jamming the mechanism.

Whenever a stud 15 is loaded into the stud receptacle 45, the transfer block is moved longitudinally to the feed port 43 and the stud 15 discharged from the stud receptacle 45 by means of air pressure communicated to the base 32 of the stud through air passages 49 and 50 which are in registry at this time.

One of the advantages of the escapement mechanism of the present invention is that the studs are loaded into the escapement mechanism first by their bases 32. With this orientation, the air pressure is exerted against the base of the stud rather than against the welding end thereof and thus has a better surface against which to eject the stud from the transfer block and along the feed tube 19.

After the stud 15 has been pneumatically blown from the transfer block 44, the block is again returned to the loading port for reception of another stud. Occasionally, the stud which has been delivered into the feed line will not be completely delivered to the welding gun, but instead, will return in a reverse direction to the escapement mechanism. In most escapement mechanisms, the returned stud will cause the mechanism to be jammed upon the next following stud being delivered to the feed port. However, in the mechanism of the present invention, the end 51 of the transfer block, when in the loading position, leaves the feed port 43 unobstructed. Thus, any stud which has returned to the escapement mechanism is free to fall into the end portion 52 of the mechanism and be subsequently pushed outwardly to the end thereof and free of the mechanism upon the transfer block being shifted to the feed position.

The reciprocal motion of the transfer block 44 is accomplished in the present invention by means of a pneumatic piston 48 operating in conjunction with valve ports 53 and 54.

The invention has been described in respect to particular embodiments thereof shown in the drawings. However, it is expected that various modifications of the above described invention will be apparent to those skilled in the art.

I claim:

1. A stud orientating and feeding mechanism for supplying studs to a welding gun on demand comprising;

A stud orientation station;

Means for delivering the studs in a substantially horizontal plane and along their longitudinal axis from a common depository to said orientation station;

A central aperture in alignment with the direction of travel of said studs at said orientation station through which the studs may pass by gravity when their longitudinal axis is in alignment with the axis of the aperture;

First means above and adjacent the side of said aperture first reached by the stud and of configuration complimentary with a given end of the studs for permitting said given end of said studs to swing upwardly when the center of gravity of said stud passes the edge of the aperture to thus permit the stud to fall through the aperture, but of configuration to prevent the stud from so swinging and passing through the aperture when the stud is oppositely aligned upon reaching the aperture; and Second means adjacent the aperture and on the opposite side thereof from said first means for camming said given end of the stud upwardly to permit the opposite end of the stud to pass through the aperture whenever the stud is in opposite alignment upon reaching the aperture whereby the studs will always be orientated so as to pass into the aperture with the given end upward.

2. The stud orientating and feeding mechanism of claim 1 further including two adjacent sidewalls on either side of the path of travel of said stud and in which said first means defines an upper wall to form a tunnel through which said studs pass in their travel toward said aperture.

3. In welding apparatus employing a hopper and stud orientation mechanism, a storage and delivery tube for storing the orientated studs disposed between the orientation mechanism and an escapement mechanism for delivering the studs to the welding gun, the improvement in said storage and delivery tube for permitting its easy removal from between the orientation mechanism and escapement mechanism comprising;

A joint in said tube cut on an angle with respect to the longitudinal axis of said tube of angle sufficient to provide a projection of the joint along the longitudinal axis of the tube of length in excess of the length of an individual stud, and Means for maintaining said joint in alignment, whereby the tube may be separated at the joint by lateral movement of the resulting two portions thereof without interference by the studs within the tube.

4. The improvements in the storage and delivery tube of claim 3 in which the means for retaining the joint in alignment comprises a collar on the external perimeter of the tube and adapted to slide longitudinally along the tube to align and secure the tube at the joint or to pass beyond the joint to permit its separation.

5. Apparatus for orientating studs having dissimilar end configurations for use with a welding gun comprising;

a passageway, at least a portion of which includes an upper wall, said passageway being of cross section at least as large as that of the stud to be orientated and through which the studs are adapted to be displaced longitudinally without respect to their end orientation, a discharge portion in the bottom of said passageway and in the path of travel of said studs and having a leading edge first reached by the studs, said discharge port being of width less than the length of said studs but of sufficient width to permit the studs to pass therethrough when their longitudinal axis is approximately aligned with said port, a relieved section in the upper wall of said passageway adjacent the discharge port and of configuration complimentary with a given first end of said studs to permit said first end to pass upwardly into said recess whenever the stud has traveled across the port to a point where its center of gravity is beyond the leading edge of said port so that the second end of said stud will be orientated to first pass into said port whenever said stud is so orientated that its second end is first passing through said passageway, and means adjacent said port and opposite the leading edge thereof for supporting the first end of said stud until the second end thereof passes the leading edge of the port permitting the second end thereof to pass into the port whenever the first end of said stud is leading in its passage through said passageway whereby, irregardless of the orientation of the stud in its travel through the passageway, the second end thereof will always be first to pass into the port.

6. The apparatus of claim 5 further including a delivery tube disposed between the port and an escapement mechanism in which tube a plurality of studs are stored once orientated, and The length of said delivery tube being predetermined in respect to the total length of the plurality of studs so as, when full, to leave the last stud therein extending beyond the upper surface of the port a sufficient distance to prevent additional studs from passing over the port to thus prevent misorientation.